United States Patent
Bruck

(10) Patent No.: US 9,069,932 B2
(45) Date of Patent: Jun. 30, 2015

(54) USER-ROTATABLE THREE-DIMENSIONALLY RENDERED OBJECT FOR UNLOCKING A COMPUTING DEVICE

(75) Inventor: James Arthur Bruck, Kanata (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/542,910

(22) Filed: Jul. 6, 2012

(65) Prior Publication Data

US 2014/0013414 A1    Jan. 9, 2014

(51) Int. Cl.
| | |
|---|---|
| G06F 21/00 | (2013.01) |
| G06F 21/30 | (2013.01) |
| G06F 21/36 | (2013.01) |
| G06F 21/46 | (2013.01) |
| G06F 21/88 | (2013.01) |
| G06F 3/03 | (2006.01) |
| H04L 9/32 | (2006.01) |

(52) U.S. Cl.
CPC ............... *G06F 21/00* (2013.01); *G06F 21/36* (2013.01)

(58) Field of Classification Search
CPC ......... G06F 21/00; G06F 21/30; G06F 21/36; G06F 21/46; G06F 21/88; G06F 3/03547; H04L 63/083; H04L 9/3226
USPC .......................................... 726/16, 19, 27, 28
See application file for complete search history.

(56) References Cited

U.S. PATENT DOCUMENTS

| | | | |
|---|---|---|---|
| 5,559,961 A | 9/1996 | Blonder | |
| 7,219,368 B2 | 5/2007 | Juels et al. | |
| 7,680,815 B2 | 3/2010 | Komine et al. | |
| 7,953,983 B2 | 5/2011 | Holt et al. | |
| 7,992,202 B2 | 8/2011 | Won et al. | |
| 8,086,745 B2 | 12/2011 | Liew et al. | |
| 8,145,912 B2 | 3/2012 | McLean | |
| 8,159,327 B2 | 4/2012 | Faith et al. | |
| 2004/0153660 A1 | 8/2004 | Gaither | |
| 2006/0136964 A1* | 6/2006 | Diez et al. | 725/37 |
| 2009/0164923 A1* | 6/2009 | Ovi | 715/764 |
| 2009/0174680 A1* | 7/2009 | Anzures et al. | 345/173 |

(Continued)

FOREIGN PATENT DOCUMENTS

| | | |
|---|---|---|
| EP | 147837 A2 | 7/1985 |
| WO | 2010108335 A1 | 9/2010 |
| WO | 2012067948 A1 | 5/2012 |

OTHER PUBLICATIONS

Fawex A Alsulalman—A Novel 3D Graphical Password Schema.
European Search Report dated Oct. 23, 2012 from corresponding EP application 12175297.6.

*Primary Examiner* — Joseph P Hirl
*Assistant Examiner* — Kalish Bell
(74) *Attorney, Agent, or Firm* — Moffat & Co.

(57) ABSTRACT

A computer-implemented method for controlling access to a computing device entails displaying a user-rotatable three-dimensionally rendered object on a display of the computing device, the object presenting a plurality of user-selectable visual indicia such that only a subset of the indicia are visible at any one angle of rotation and providing access to the computing device based on user input received in relation to at least one of the visual indicia. The object may be spherical or polyhedral or it may be composed of a plurality of independently rotatable rings that together form a generally spherical shape. The visual indicia may be letters, numbers, symbols, colours, photographs or any other visually distinctive indication.

16 Claims, 6 Drawing Sheets

(56) References Cited

U.S. PATENT DOCUMENTS

| | | | |
|---|---|---|---|
| 2010/0093400 A1* | 4/2010 | Ju et al. | 455/566 |
| 2010/0169958 A1 | 7/2010 | Werner et al. | |
| 2011/0093939 A1* | 4/2011 | Barbour et al. | 726/7 |
| 2011/0119629 A1* | 5/2011 | Huotari et al. | 715/836 |
| 2011/0162066 A1 | 6/2011 | Kim | |
| 2012/0050315 A1* | 3/2012 | Stone | 345/619 |
| 2012/0260217 A1* | 10/2012 | Celebisoy | 715/836 |

\* cited by examiner

USER-ROTATABLE THREE-DIMENSIONALLY RENDERED OBJECT FOR UNLOCKING A COMPUTING DEVICE

CROSS-REFERENCE TO RELATED APPLICATIONS

This is the first application filed for the present technology.

TECHNICAL FIELD

The present technology relates generally to computing devices and, in particular, to visual passwords and graphical access control techniques.

BACKGROUND

Access control is a process of restricting user access to computing devices, network accounts, applications, or data and is often achieved using simple password techniques requiring the user to enter a secret alphanumeric string of text known only to the user.

Graphical access control techniques (or visual login techniques) replace the textual password with what is referred to colloquially as a visual password, which some users may find easier to remember.

Graphical access control typically requires a user to select an image or sequences of images from a set of images or to select an object or sequence of objects from within an image. In other words, to gain access to a computing device, the user may trace out a two-dimensional pattern, select objects from an array in a predetermined sequence, or even touch objects in a digital photograph or in a graphically rendered virtual environment. The gesture, pattern or sequence of selections thus functionally represents a code that is secret to the user.

In known graphical access control techniques, the images or sets of images are generally two-dimensional and static. Security may be a problem, particularly in cases where the pattern or sequence is easily discernible by a casual observer. Accordingly, an improved graphical access control technique would be highly desirable. Such a technique is disclosed in the present specification.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
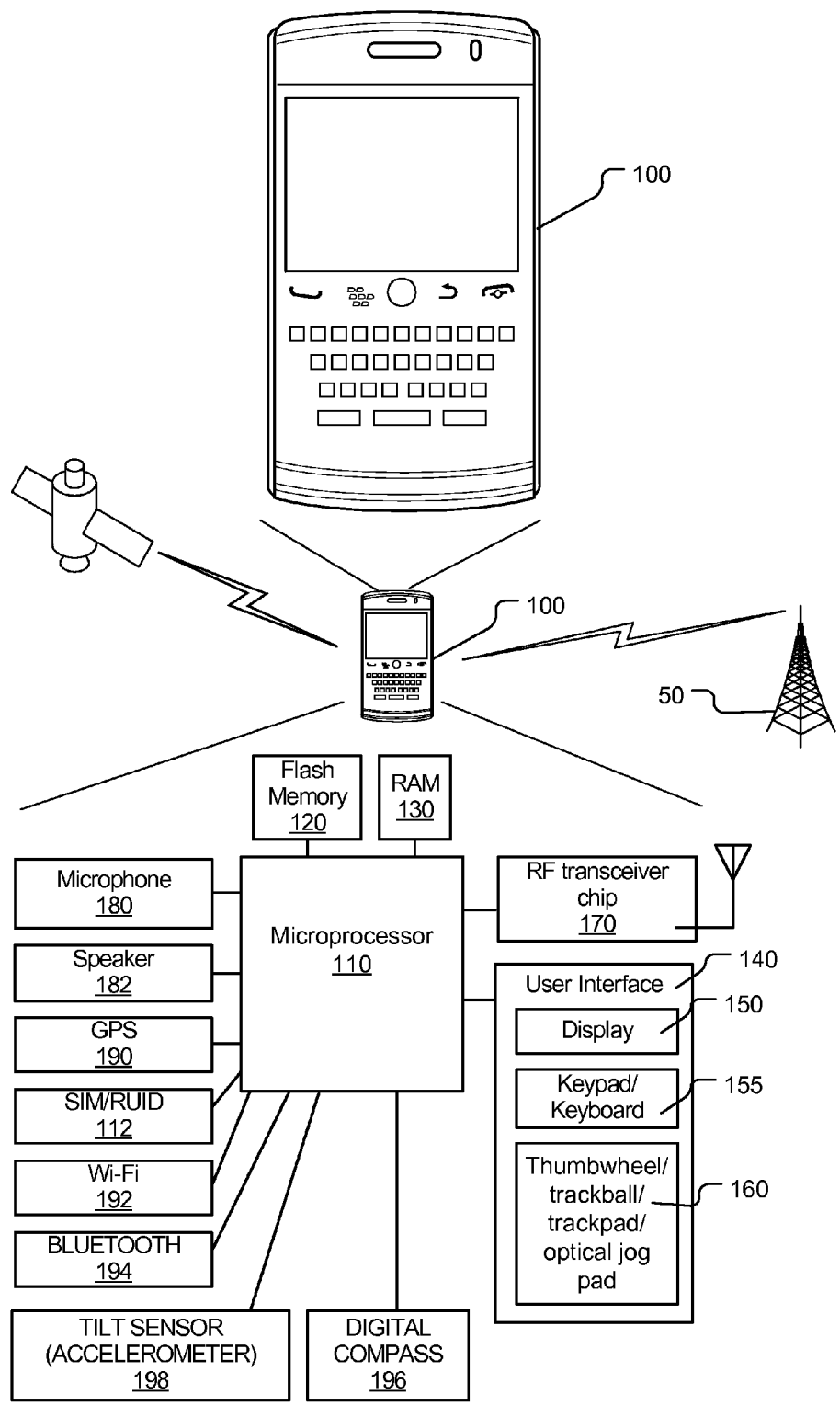
FIG. 1 is a depiction of a mobile device on which the present technology may be implemented, the depiction including a schematic depiction of some components of the mobile device.

The present technology provides an access control technique for controlling access to a computing device. A three-dimensionally rendered object is user-rotatable. The three-dimensionally rendered object presents visual indicia that the user may select in a certain sequence or combination that is secret to the user. Since not all of the visual indicia are visible at a given angle, the user may rotate the three-dimensionally rendered object to view and select visual indicia.

Accordingly, one aspect of the present technology is a computer-implemented method for controlling access to a computing device, the method comprising displaying a user-rotatable three-dimensionally rendered object on a display of the computing device, the object presenting a plurality of user-selectable visual indicia such that only a subset of the indicia are visible at any one angle of rotation, and providing access to the computing device based on user input received in relation to at least one of the visual indicia.

Another aspect of the present technology is a computer-readable medium comprising instructions in code which when loaded into a memory and executed by a processor of a computing device cause the computing device to display a user-rotatable three-dimensionally rendered object on a display of the computing device, the object presenting a plurality of user-selectable visual indicia such that only a subset of the indicia are visible at any one angle of rotation, and provide access to the computing device based on user input received in relation to at least one of the visual indicia.

Another aspect of the present technology is a computing device having a display for displaying a user-rotatable three-dimensionally rendered object presenting a plurality of user-selectable visual indicia such that only a subset of the indicia are visible at any one angle of rotation, a user input device for receiving user input in relation to at least one of the visual indicia, and a processor operatively coupled to memory for determining if user access is to be granted to the computing device based on the user input.

The details and particulars of these aspects of the technology will now be described below, by way of example, with reference to the drawings.

By way of overview, the present technology provides a novel graphical access control technique that displays a user-rotatable three-dimensionally rendered object. This object presents visual indicia in the form of letters, numbers, symbols, colours, markings, logos, photos, etc. The user selects a sequence of elements bearing these visual indicia. If the user-inputted sequence matches the secret sequence, the device grants access to the device. Only a subset of the elements bearing the visual indicia are visible at any one angle of rotation (since some of the elements bearing the visual indicia are on the far side of the object and thus hidden from view at that angle). To view and select these hidden elements, the user rotates the object to bring the elements bearing these visual indicia into full view.

FIG. 1 is a depiction of a mobile device as one example of a computing device that may be used to implement this novel graphical access control technique. This computing device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the computing device 100 includes a user interface 140 for interacting with the device and its applications and, in this instance, for receiving user input to rotate the object and to sequentially select the elements bearing the visual indicia. The user interface 140 may include one or more input/output devices, such as a display screen 150 (e.g. an LCD or LED screen or touch-sensitive display screen), and a keyboard or keypad 155. The user interface may also include an optical jog pad 160 and/or a thumbwheel, trackball, track pad or equivalent.

As depicted by way of example in FIG. 1, the computing device 100 may include a transceiver 170 for communicating with other devices. The transceiver 170 may be a radiofrequency (RF) transceiver for wirelessly communicating with one or more base stations over a cellular wireless network using cellular communication protocols and standards for both voice calls and packet data transfer such as GSM, CDMA, GPRS, EDGE, UMTS, LTE, etc. Where the computing device 100 is a wireless communications device, the device may include a Subscriber Identity Module (SIM) card 112 for GSM-type devices or a Re-Usable Identification Module (RUIM) card for CDMA-type devices. The RF transceiver 170 may include separate voice and data channels.

Alternatively, where the computing device is a wired device like a desktop computer, the transceiver 170 of the computing device 100 may be a modem or equivalent (for wired communications) using, for example, the TCP/IP protocol for Internet data communication. The computing device 100 may also include one or more ports for wired connections, e.g. USB, HDMI, FireWire (IEEE 1394), etc.

The computing device 100 may optionally include a microphone 180 and a speech-recognition subsystem for transforming voice input in the form of sound waves into an electrical signal. The electrical signal is then processed by a speech-recognition module (digital signal processor) to determine keywords or phrases from the voice input.

Optionally, the computing device 100 may include a speaker 182 and/or an earphone jack.

Optionally, the computing device 100 may also optionally include a positioning subsystem such as a Global Positioning System (GPS) receiver 190 (e.g. in the form of a chip or chipset) for receiving GPS radio signals transmitted from one or more orbiting GPS satellites.

Optionally, the computing device 100 may include a Wi-Fi™ transceiver 192, a Bluetooth® transceiver 194, and/or a near-field communications (NFC) chip. The computing device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the computing device may include other sensors like a digital compass 196 and/or a tilt sensor or accelerometer 198.

As noted above, a mobile device or wireless communications device is one example of a computing device 100 on which the present technology may be implemented. Other computing devices 100 may include desktop personal computers, laptops, notebooks, palmtops, tablets, personal digital assistants, game consoles, portable navigation devices, set-top boxes, or other such devices, apparatuses, equipment or systems like touch-screen kiosks, bank machines, photocopiers, etc. where it is desirable to implement user access control. As noted above, the technologies disclosed herein may be employed on either wireless or wired devices.

The access control techniques disclosed herein may be applied not only to a main login screen of a computing device but may also be used to control access to a network account, to a hardware component or memory device (e.g. external hard drive), or to any application or data, etc. Therefore, the concept of controlling access to a computing device should be understood in its broad sense of controlling access to a device, application, account, or data.

Figure 2:
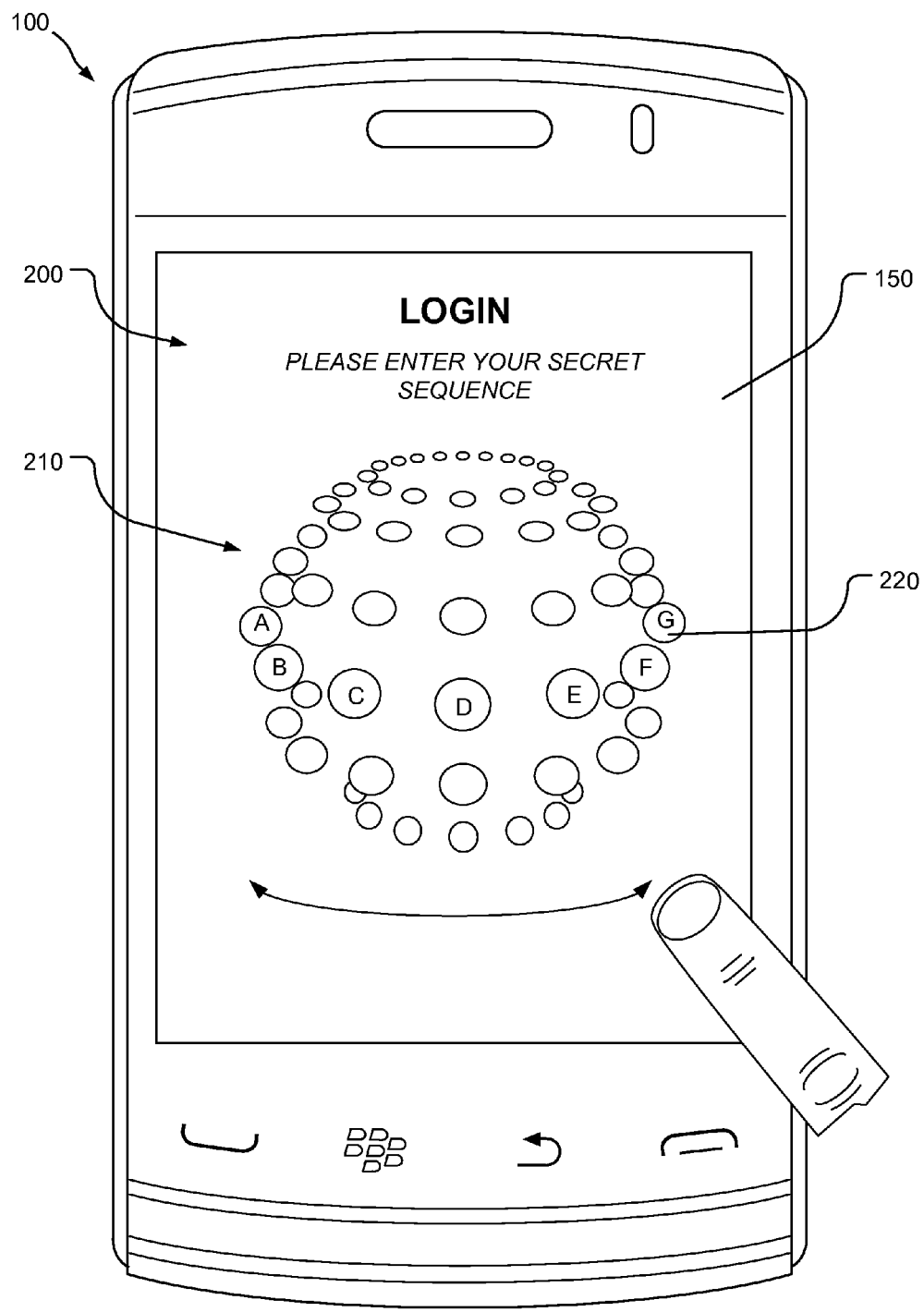
FIG. 2 is a depiction of a mobile device displaying a three-dimensionally rendered object as part of a login screen.

As depicted in FIG. 2, the computing device 100 thus uses the display 150 to display on a main login screen 200 a user-rotatable three-dimensionally rendered object 210. The main login screen 200 controls access to the computing device 100 by requiring that the user perform a sequence of selections with respect to the three-dimensionally rendered object 210. The 3D-rendered object presents a plurality of user-selectable visual indicia 220. As these indicia are disposed around the outer surface(s) of the object, only a subset of the indicia are visible at any one angle of rotation. Some indicia are on the far side of the object and thus hidden from view at any given angle of rotation. It is thus necessary to rotate the object to view and select the hidden indicia. The user rotates the object by providing suitable user input to a user input device. The user selects the visual indicia (or the elements bearing the visual indicia) using the user input device. Once sequence of selections is buffered in memory, the processor determines if user access is to be granted to the computing device based on the user input, i.e. by determining whether the sequence matches the secret sequence previously stored as such by the user.

In one main implementation, the device rotates the three-dimensionally rendered object in response to receiving first user input and receives second user input that selects at least one of the plurality of visual indicia. In other words, the user may alternately rotate and select elements (visual indicia) to compose the secret sequence. Once the sequence has been composed, the device may require a confirmation command, e.g. enter, OK, login, send, etc. to signal to the device that the sequence is ready for validation. In another implementation, the device automatically recognizes when the sequence has been completed and logs the user into the device. If the incorrect sequence is provided, the device may present an indication to the user that login has failed because the sequence is incorrect. Optionally, the device may permit the user a fixed number of tries before locking out the device either permanently or temporarily. Optionally, the device may provide a password override if the user cannot remember the visual sequence. Optionally, the device may offer a hint to the user to help the user recall the visual sequence.

The display 150 may be a touch-sensitive display. In another implementation, the computing device includes a contactless gesture recognition system. Any suitable gesture, swipe or touch input may be used to rotate the object. For example, the user may swipe left or right. In a variant, the user may touch the screen with two fingers to define an axis and then with the other hand swipe a finger generally orthogonally to the axis to cause the object to rotate or spin. Swipe gestures may be provided using other user input devices such as a trackpad, optical jog pad, touch-sensitive mouse, stylus pad, or even using a conventional mouse to click on onscreen virtual arrows or with a scroll wheel. Arrow keys on a keyboard may also be used to rotate the object. As will be appreciated, rotation of the object may be achieved in a variety of ways.

Figure 3:
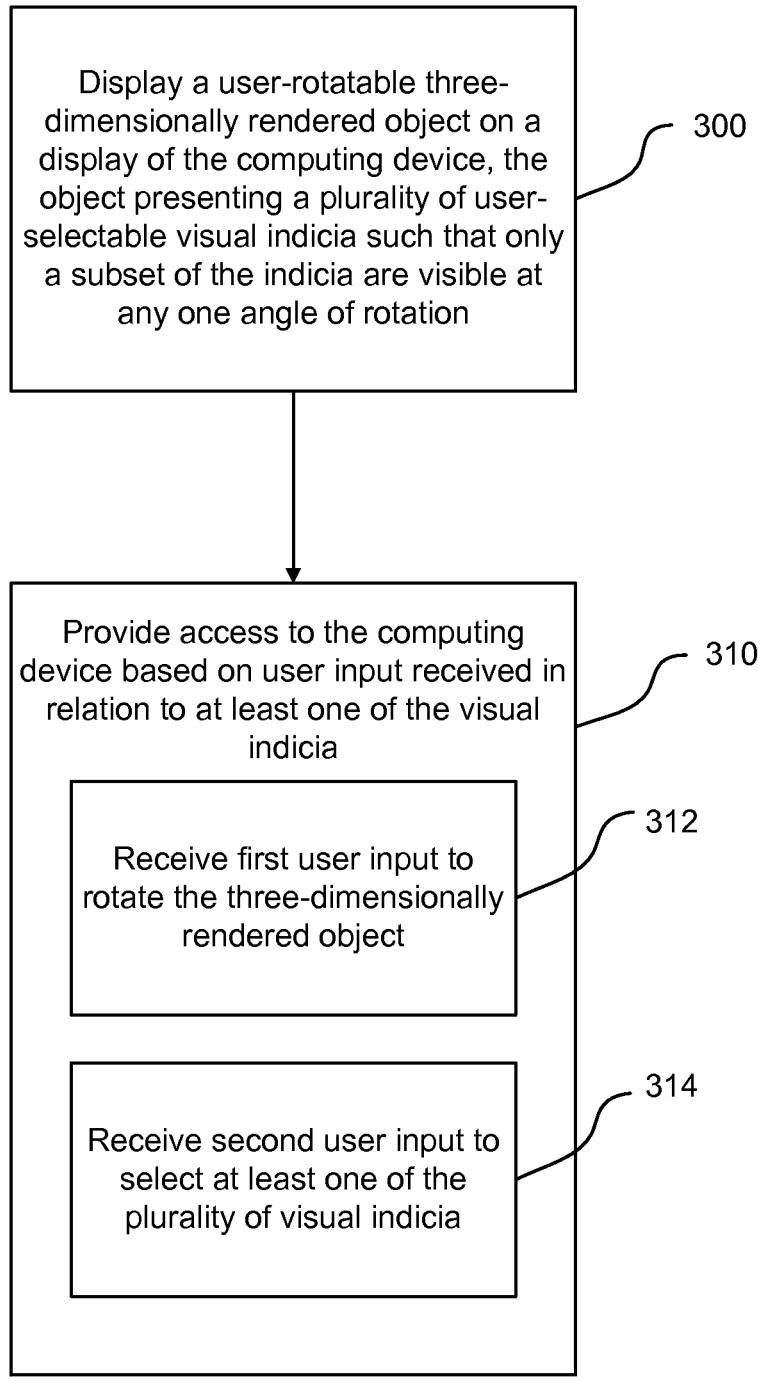
FIG. 3 depicts a flowchart of a method in accordance with a main implementation of the present technology.

This technology enables a computer-implemented method for controlling access to a computing device. As depicted in FIG. 3, the method entails a step 300 of displaying a user-rotatable three-dimensionally rendered object on a display of the computing device, the object presenting a plurality of user-selectable visual indicia such that only a subset of the indicia are visible at any one angle of rotation and a step 310 of providing access to the computing device based on user input received in relation to at least one of the visual indicia. The step 310 may include substep 312 of receiving first user input to rotate the three-dimensionally rendered object and substep 314 of receiving second user input to select at least one of the plurality of visual indicia. At step 312, a rotation command may cause the object to rotate about a fixed, predetermined axis such as a vertical axis or a horizontal axis. The user-rotatable object may also be independently rotatable about two orthogonal axes, e.g. a vertical axis and a horizontal axis. The user-rotatable object may also be rotated about a user-defined axis that the user defines, for example by touching two points onscreen or by swiping linearly across the screen.

To select a visual indicium (or an element bearing an indicium) at step 314, the user provides user input to the device in the form of a selection (or selection command). The selection of an indicium may be done by touching the indicium or an element (face, area, sector of the object) bearing the indicium in the case of a touch-screen device. Alternatively, selection of an indicium may be done by placing a cursor/arrow over the indicium or element bearing the indicium (using a mouse, trackpad, optical jog pad, etc.) and then clicking the indicium or element. In yet another alterative, a contactless gesture recognition system may recognize a gesture or input command in relation to the indicium. As will be appreciated, any input or command performed by a user in relation to the indicium may be used to signify to the device that the indicium has been selected. In one embodiment, the processor may be configured to move an onscreen selection tool (cursor, arrow, pointer, frame, highlighter, etc.) incrementally (i.e. in a stepwise fashion) from one indicium to the next to facilitate graphical navigation over the surface of the object. In this embodiment, in response to receiving user input, the selection tool jumps from one indicium to a subsequent indicium so that the selection tool is never between indicia.

The user-rotatable three-dimensionally rendered object is a graphical object that is rendered or drawn onscreen. This 3D-rendered object may be a single solid or a plurality of interconnected or disconnected solids that rotate in unison in response to a rotation command. The user-rotatable three-dimensionally rendered object may comprise independently rotatable components, sections or elements such that one portion of a solid or group of solids may be rotated relative to others. For example, an object or solid may be subdivided into individually movable components or elements or groups of elements that may be rotated relative to other elements of the object.

Figure 4:
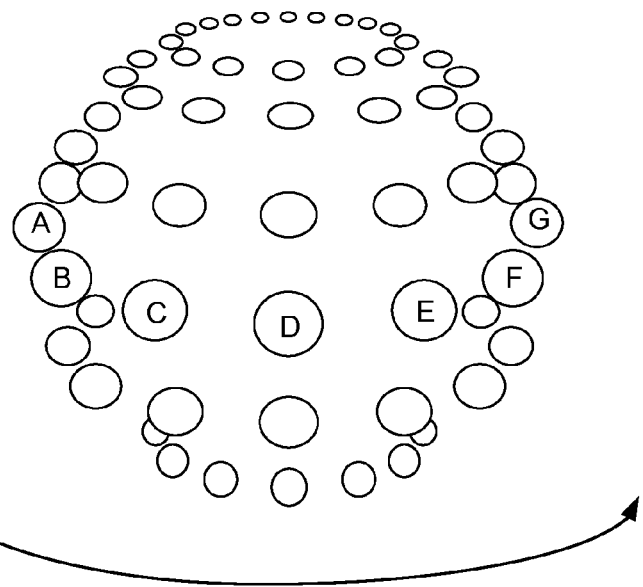
FIG. 4 depicts an example of a set of independently rotatable rings presenting visual indicia in the form of letters.

In one implementation, illustrated by way of example in FIG. 4, the object comprises a plurality of independently rotatable rings that together form a generally spherical shape. Each of the independently rotatable rings may be formed of a plurality of mini-spheres each having its own unique visual indicium. Each group of mini-spheres in a given ring is independently rotatable relative to the other rings.

The mini-spheres are marked with visual indicia that enables the user to enter a sequence of indicia representing a secret code. In the example presented in FIG. 4, the visual indicia are letters. The sequence thus forms a password. Selecting letters may enable the user to spell out a password or passphrase. Selecting numbers (or alphanumeric symbols) may enable the user to enter a passcode or PIN. Selecting any other visual indicia in a predetermined sequence enables the user to enter the secret visual code or secret sequence of indicia.

To operate the multi-ring object of FIG. 4, the user rotates a first ring to view the visual indicia on the mini-spheres of the first ring. The user then selects the desired mini-sphere from the first ring. The user then rotates the second ring to view the visual indicia on the second ring and then to select one of these mini-spheres. The user then continues this process of rotating a ring and selecting a mini-sphere from the ring. It will be appreciated that in some instances, the user need not rotate any ring because the elements needs to compose the code are already visible onscreen. However, for better security the device will recommend to the user that a code be selected that requires at least some rotation of at least one of the rings. In one embodiment, the user selects only one element from each ring. In another embodiment, the user may select multiple indicia from a given ring. The number of mini-spheres in each ring may be varied from what is illustrated. Indeed, the number of mini-spheres may vary from one ring to another. The number of mini-spheres in a given ring may be less than the set of available indicia. For example, the number of mini-spheres may be less than 10 in which case not every numeral from 0 to 9 is presented on a given ring. Likewise, as another example, if the mini-spheres display letters, not every letter of the alphabet will be displayed in a given ring.

Visual indicia may include letters, numbers, symbols, markings, colours, patterns, shadings, logos, drawings, photographs, or any other visually distinctive indication. In one embodiment, each of the visual indicia is unique although this is not necessary. In one embodiment, the visual indicia may be a hybrid of two types of visual indicia, e.g. a mix of letters and numbers or a mix of colours and logos.

In one implementation, the visual indicia displayed on the object are fixed in the sense that the visual indicia are displayed in the same positions every time the user logs in. In another implementation, the visual indicia are scrambled randomly so that the position of the visual indicia changes every time the user logs in. The visual indicia must include at least one instance of each element of the secret code to enable the user to compose the secret code.

As illustrated in FIGS. 5 to 8, the object may be a sphere (FIG. 5), a cube (FIG. 6), a pyramid (FIG. 7), a dodecahedron (FIG. 8) or any other polyhedron or three-dimensionally rendered solid.

Figure 5:
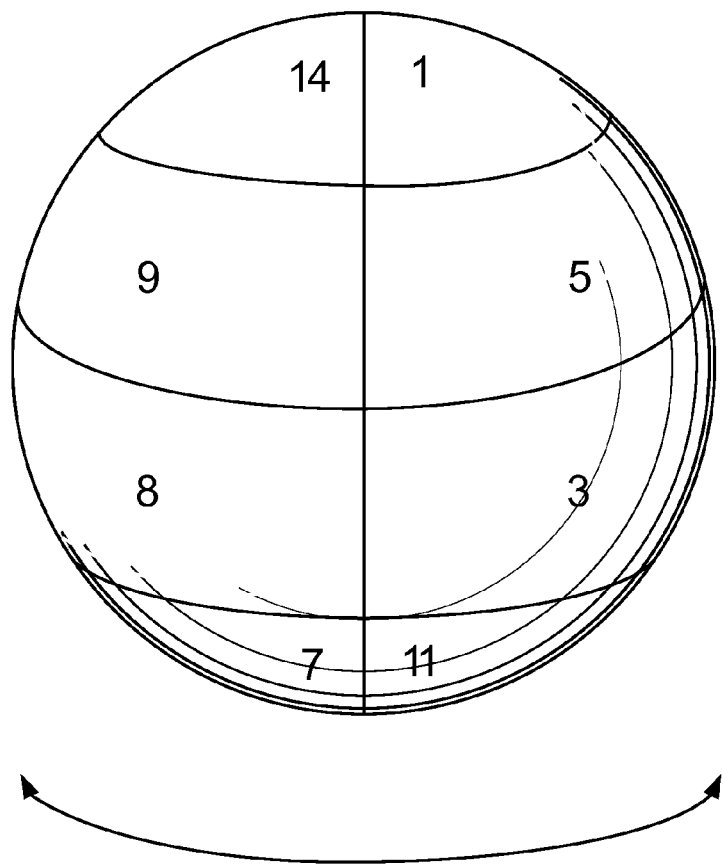
FIG. 5 is an example of a spherical object presenting visual indicia in the form of numbers.

FIG. 5 is an example of a spherical object presenting visual indicia in the form of numbers. Where the object presents only numbers, the sequence forms a PIN or passcode. Any suitable ranges of numbers may be used. In some embodiments, not every digit or numeral in the range is necessarily presented or in some embodiments, there may be more than digit or numeral presented on the object. The object must present, however, at least the numerals that are required to compose the secret code.

Figure 6:
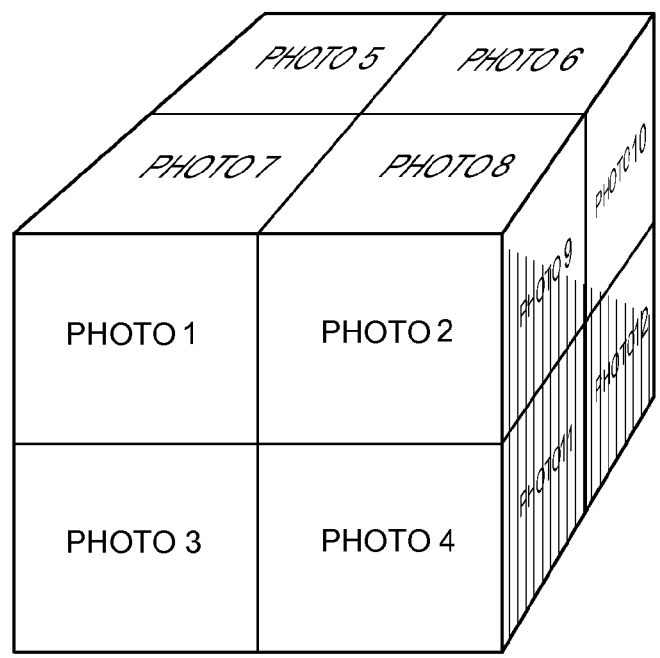
FIG. 6 is an example of a cubic object presenting visual indicia in the form of digital photos.

FIG. 6 is an example of a cubic object presenting visual indicia in the form of digital photos. Photos of people, places and things may be used to provide a code. For example, the secret code may require the user to select a photo of the Eiffel Tower, then of the Statue of Liberty, then of Big Ben from amongst a panoply of photos of landmarks from around the world. Instead of photos, the indicia may be icons, clipart, or any graphics or drawings, or any combination thereof.

Figure 7:
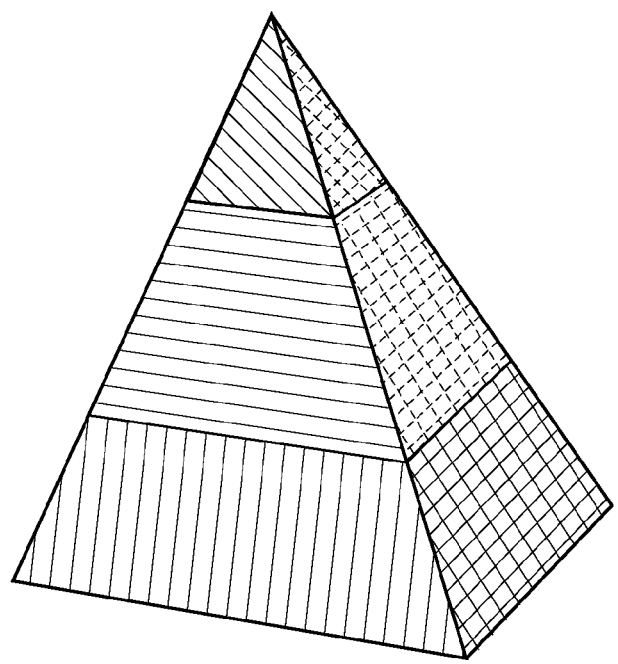
FIG. 7 is an example of a pyramidal object presenting visual indicia in the form of different colours.

FIG. 7 is an example of a pyramidal object presenting visual indicia in the form of different colours. Each face of the pyramidal object may be subdivided into elements, sectors or areas that is coloured with one of a plurality of colours from a colour palette. The colour palette may be user-configurable. A secret code may thus be a sequence such as, for example, blue-red-blue-yellow-green. Any number of different colours or shades may be employed.

Figure 8:
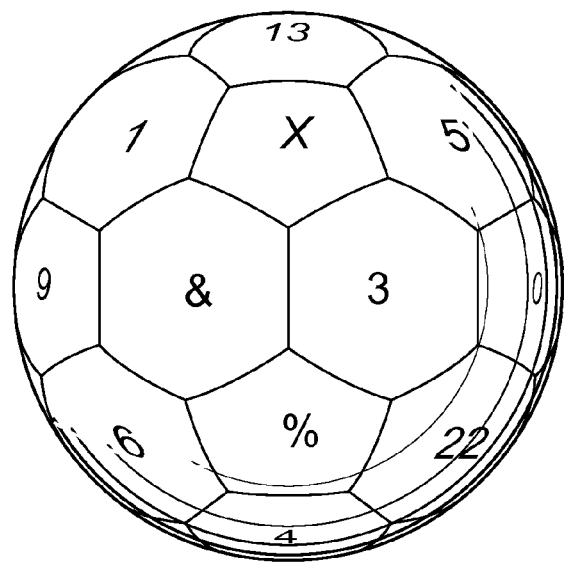
FIG. 8 is an example of a dodecahedral object presenting visual indicia in the form of a mix of numbers, letters and symbols.

FIG. 8 is an example of a dodecahedral object, as an example of a polyhedron, presenting visual indicia in the form of a mix of numbers, letters and symbols. Any other indicia may be included such as photos, shadings, patterns, logos, national flags, emblems, heraldry, etc. FIG. 8 demonstrates how indicia of different types may be combined in a single object.

In one example, a dodecahedron (which resembles a soccer ball) may be adorned with soccer team logos, national team colours/logos/flags, etc. Similarly, other professional sports teams, famous players, jerseys, stadiums, etc. may be represented on the faces of a polyhedron.

These examples are presented solely to illustrate the underlying concepts and it should be appreciated that many different variations may be implemented.

The object shapes and visual indicia may be reconfigured by the user of the device.

In one implementation, the processor causes the display to display an object reconfiguration screen to receive user selection of an object shape from among a selection of shapes (e.g. spherical and polyhedral shapes).

In one implementation, the processor causes the display to display an indicia reconfiguration screen to receive user selection of a type of indicia from among a selection of indicia comprising letters, numbers, symbols, colours, and photographs or any combination thereof.

In one variant, the user may import his or her own photographs to customize the object. In this variant, the processor is configured to assign photographs stored in the memory of the computing device or any connected device to predetermined surface areas, sectors, faces or elements of the object in response to user input. User-imported photographs may be used to customize the device. For example, the object may be divided into sectors with photos of one's friends, family members or pets. The user may be required to touch the photo of her mother, then her father, then her brother, then her pet cat in that order to gain access.

In one embodiment, the elements must be touched in the correct sequence (fixed order) to form the passcode. In another embodiment, elements may be touched in any sequence (in any order) provided the correct combination is selected. In other words, the selection order may or may not be a factor. As an example of where selection order is not important, the object may present four user-selectable elements, e.g. A, B, C, D and the pass code may be A, B in any order. The user could thus select B, A or A, B in any order to unlock the device. In yet another embodiment, simultaneous selection of two or more elements may be required, e.g. simultaneously touch the blue square and the red square then simultaneously touch the green square and the yellow square.

Optionally, when an element (visual indicium) is selected, it may be highlighted, shaded, or change colour to visually confirm the selection.

Although a single solid is presented in most embodiments, in another embodiment the device may present more than one solid, e.g. two spheres or a sphere and a cube, requiring the user to make selections from both solids.

In a variant, the user may be required to provide the correct selection of elements on the first object in order to gain access to a second object which also requires the user to select the correct elements of that second object.

In another variant, the access control module on the device may be programmed to randomly vary the type of solid. In this variant, the set of visual indicia are distributed over each randomly generated solid such that only a subset of the visual indicia are visible from the default angle (i.e. default perspective) of the solid. The default angle/perspective is the angle/perspective of the object when it is first rendered onscreen. The default angle/perspective may be randomly determined each time the user logs in or it may be the same each time.

Figure 9:
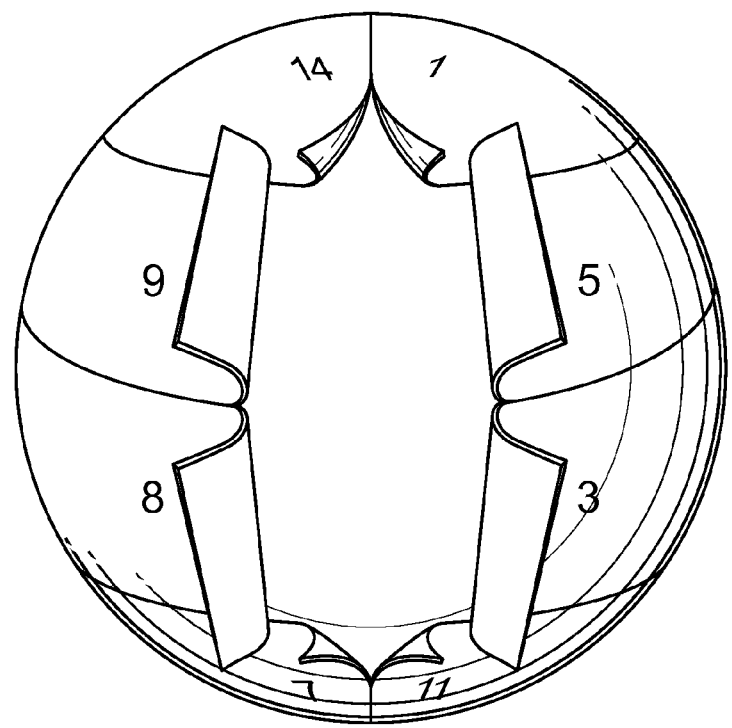
FIG. 9 is an example of a spherical object visually transforming onscreen to signify that the user input corresponds to the secret sequence and that access is being granted to the user.

In one implementation, as illustrated in FIG. 9, the processor causes the object to visually transform onscreen to signify that access is granted. For example, the object may gradually disappear, fade, disintegrate, crumble, peel open, explode, implode, bounce off screen, morph into another shape, change colour, etc. In addition, any audible chimes, notes, sound effects or music may be played while the object transforms. The visual or audible effects may be user-configurable from an options page or menu.

This technology may be combined with other cryptographic or access control techniques, such as password entry, biometric input (digital fingerprint, voice print, face recognition, etc.). The three-dimensionally rendered object may be presented as a prelude to a password or other biometric request or may follow entry of the proper password or biometric input.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A computer-implemented method for controlling access to a computing device, the method comprising:
   displaying a user-rotatable three-dimensionally rendered object on a display of the computing device, the object presenting a plurality of user selectable visual indicia such that only a subset of the indicia are visible at any one angle of rotation, wherein each one of the indicia is a unique letter, number or symbol;
   receiving user input sequentially selecting a plurality of the visual indicia; and
   providing access to the computing device based on the user input,
   wherein the object comprises a plurality of independently rotatable rings that together form a generally spherical shape, and wherein each of the independently rotatable rings is formed of a plurality of mini-spheres each having its own unique visual indicium.

2. The method as claimed in claim 1 wherein receiving the user input comprises:
   receiving first user input to rotate one of the three-dimensionally rendered rings; and
   receiving second user input to select the plurality of visual indicia.

3. The method as claimed in claim 2 wherein receiving the first user input comprises receiving a touch gesture on a touch-sensitive display.

4. The method as claimed in claim 2 wherein receiving the first user input comprises receiving a contactless gesture detectable by a contactless gesture recognition system.

5. The method as claimed in claim 1 further comprising displaying an object reconfiguration screen to receive user selection of an object shape from among a selection of spherical and polyhedral shapes.

6. The method as claimed in claim 5 further comprising displaying an indicia reconfiguration screen to receive user selection of a type of indicia from among a selection of indicia comprising letters, numbers, symbols, colours, and photographs.

7. The method as claimed in claim 1 wherein the visual indicia comprise unique numbers, letters or symbols.

8. The method as claimed in claim 1 wherein the object visually transforms onscreen to signify that access is granted.

9. A non-transitory computer-readable medium comprising instructions in code which when loaded into a memory and executed by a processor of a computing device cause the computing device to:
   display a user-rotatable three-dimensionally rendered object on a display of the computing device, the object presenting a plurality of user selectable visual indicia such that only a subset of the indicia are visible at any one angle of rotation, wherein each one of the indicia is a unique letter, number or symbol;
   receive user input sequentially selecting a plurality of the visual indicia; and
   provide access to the computing device based on user input,
   wherein the object comprises a plurality of independently rotatable rings that together form a generally spherical shape, and wherein each of the independently rotatable rings is formed of a plurality of mini-spheres each having its own unique visual indicium.

10. The computer-readable medium as claimed in claim 9 wherein the code to receive user input comprises:
    code for receiving first user input to rotate one of the three-dimensionally rendered rings; and
    code for receiving second user input to select at least one of the plurality of visual indicia.

11. The computer-readable medium as claimed in claim 9 further comprising code for causing the device to display one of (i) an object reconfiguration screen to receive user selection of an object shape from among a selection of spherical and polyhedral shapes and (ii) an indicia reconfiguration screen to receive user selection of a type of indicia from among a selection of indicia comprising letters, numbers, symbols, colours, and photographs.

12. The computer-readable medium as claimed in claim 9 wherein the visual indicia comprise unique numbers, letters or symbols.

13. A computing device comprising:
    a display for displaying a user-rotatable three-dimensionally rendered object presenting a plurality of user-selectable visual indicia such that only a subset of the indicia are visible at any one angle of rotation, wherein each one of the indicia is a unique letter, number or symbol;
    a user input device for receiving user input sequentially selecting a plurality of the visual indicia; and
    a processor operatively coupled to memory for determining if user access is to be granted to the computing device based on the user input,
    wherein the object comprises a plurality of independently rotatable rings that together form a generally spherical shape, and wherein each of the independently rotatable rings is formed of a plurality of mini-spheres each having its own unique visual indicium.

14. The computing device as claimed in claim 13 wherein the processor is configured to:
    rotate one of the three-dimensionally rendered rings in response to receiving first user input; and
    receive second user input to select at least one of the plurality of visual indicia.

15. The computing device as claimed in claim 13 wherein the processor causes the display to display one of (i) an object reconfiguration screen to receive user selection of an object shape from among a selection of spherical and polyhedral shapes and (ii) an indicia reconfiguration screen to receive user selection of a type of indicia from among a selection of indicia comprising letters, numbers, symbols, colours, and photographs.

16. The computing device as claimed in claim 13 wherein the processor causes the object to visually transform onscreen to signify that access is granted.

* * * * *